United States Patent Office 3,661,821
Patented May 9, 1972

3,661,821
RESINOUS CONDENSATION PRODUCTS AND METHOD OF PREPARING SAME
Cornelio Caldo and Giuseppe Cantatore, Terni, Italy, assignors to Montecatini Edison S.p.A., Milan, Italy
No Drawing. Continuation of application Ser. No. 506,016, Nov. 1, 1965, which is a continuation-in-part of abandoned application Ser. No. 30,732, May 23, 1960. This application May 15, 1970, Ser. No. 37,448
Claims priority, application Italy, May 26, 1969, Pat. No. 611,258; Dec. 10, 1959, Pat. No. 643,990; Feb. 22, 1960, Pat. No. 682,346, Oct. 22, 1959, Pat. No. 623,526
Int. Cl. C08f 25/12
U.S. Cl. 260—23 EP    6 Claims

ABSTRACT OF THE DISCLOSURE

New condensation products comprising amine-epichlorhydrin condensates modified by further reaction with aliphatic polyamine, or aliphatic imine or with alkylating or arylating agents and process for preparing same. Particularly useful as tinctorial modifier for crystalline polymers. Dyeable textile fibers prepared from composition of crystalline polymers and condensation products.

---

This application is a continuation of copending application Ser. No. 506,016 filed Nov. 1, 1965, now abandoned, which in turn is a continuation-in-part of application Ser. No. 30,732, filed May 23, 1960, now abandoned.

This invention relates to new resinous condensation products. More particularly, the invention relates to new resinous products which are fusible, water-insoluble condensates of epichlorhydrin and amines and to dyeable blends thereof with synthetic crystalline polymers.

Previously, it has been proposed to prepare resinous products by condensing epichlorhydrin with organic compounds including diphenols, various polyfunctional organic compounds and amines.

It is also known that shaped articles, particularly textile fibers, formed of crystalline fiber-forming polypropylene, have very desirable properties but are not as readily dyeable as natural fibers. The same is true of shaped or molded articles formed from crystalline copolymers of propylene with, e.g., ethylene, butene-1, etc. and from various other synthetic polymeric materials including crystalline polyethylene, crystalline copolymers rich in ethylene, and the homopolymers and copolymers of acrylonitrile.

The new resinous condensates of this invention may be used for various purposes. However, it has been found that these condensates have the special property of being compatible with various synthetic crystalline polymeric materials and, when mixed therewith, even in relatively small amounts, improve the dyeing characteristics of textile fibers or other articles formed from the mixture without deleteriously affecting the desirable physical properties normally associated with crystalline polymeric material.

We have found that new resinous condensates can be obtained by condensing epichlorhydrin with a selected amine or a salt thereof, in the presence of a condensing agent such as, for example, a hydroxide or carbonate of an alkali metal, or in the presence of a condensation product of ethylene oxide with an alcohol containing from 10 to 14 carbon atoms. The condensation reaction can be carried out in an inert solvent such as ethyl alcohol, and at a temperature of, e.g., 0° C. to 100° C. The condensation conditions the amine, and the relative proportions of epichlorhydrin to amine are selected to yield a resinous condensate which has a solubility in water of between about 0.1 and 0.034% by weight.

We have further found that the dyeability of the articles formed from the mixture of condensate and crystalline polymer is improved in respect to certain dyes by modifying the resinous condensation product. Thus, for instance, when an aliphatic mono-amine has been employed in preparing the condensation product, the condensate can be reacted with a poly-amine such as, for example, ethylene diamine, hexamethylene diamine, tetraethylene pentamine, 1,2-propylene diamine or dipropylene triamine or with an aliphatic imine. Alternatively, when a polyamine has been employed, the resulting resinous condensate can be alkylated or arylated, preferably with an alkyl or aryl halide.

When the product mixed with the synthetic crystalline polymer is a condensate of an aliphatic mono-amine with epichlorohydrin which has been modified with an aliphatic imine such as for instance, ethylene imine, the fibers formed from the mixture are particularly receptive to wool acid dyes.

The ratio of epichlorhydrin to amine is dependent on the particular amine used. The ratio of modifying agent to amine will depend upon the particular further treatment to which the condensate is subjected.

When the condensation product is one obtained from a primary or secondary mono-amine, a very suitable molar ratio of epichlorhydrin to amine is one within the range 1:1 to 5:1. When such a condensate is further modified with poly-amine, a preferred molar ratio of poly-amine to mono-amine is in the range of 0.1:1 to 10:1. Likewise, when an aliphatic imine is used instead of a poly-amine/the molar ratio of imine to mono-amine is preferably in the range of 0.1:1 to 10:1.

A particularly valuable dye-modifying product is obtained by condensing a poly-amine with epichlorhydrin in a molar ratio of poly-amine to epichlorhydrin of 1.2 to 1.5:1 and then reacting the thus obtained condensate with an alkyl or aryl halide to give a molar ratio of alkyl or aryl group to epichlorhydrin within the range 0.1 to 2:1.

When the ratio of poly-amine to epichlorhydrin is below 1.2:1 there is a tendency for undesirable cross-linking to occur in the condensation product which may make it infusible, and therefore not readily dispersible in a crystalline polyolefin.

A very useful resinous condensation product is that obtained by reacting 1 mol of epichlorhydrin with 1.3 mols of hexamethylene diamine and then reacting the resulting condensate with 0.4 mol of octadecyl chloride. This resinous product may be added in an amount of, for example, about 5% by weight to crystalline fiber-forming polypropylene to give a composition with improved dyeing properties.

The amines employed in preparing the resinous condensation products include either primary mono-amines having from 3 to 30 carbon atoms or secondary monoamines having from 4 to 60 carbon atoms and may be either aliphatic or aromatic. Aliphatic poly-amines having from 2 to 60 carbon atoms can also be employed. Very suitable aliphatic mono-amines are n-dodecylamine, n-octadecylamine, dioctylamine, dioctadecylamine, and hexadecylamine. An example of an aromatic amine is, for instance, aniline. Poly-amines which can be employed include ethylene diamine, hexamethylene diamine, tetraethylene pentamine, 1,2-propylene diamine and dipropylene triamine.

Mixtures of the amines can be used.

As salts of the amines there can be employed, for instance, hydrochlorides or acetates.

When the resinous condensates of this invention are added to crystalline polyolefins such as crystalline fiber-forming polypropylene, in proportions of from about 1% to 25% by weight based on the weight of the composition the resulting composition can be softened and extruded to form shaped articles. Textile fibers can be obtained by melt spinning of such compositions.

The compositions can be obtained by mixing the resinous condensate with the crystalline polymer, e.g., with crystalline fiber-forming polypropylene, in a Werner mixer, a ball mill, or a similar apparatus. The composition can be granulated in a screw device, melted, and extruded through a suitable shaping device. In this manner, readily dyeable textile can be obtained by melt-spinning a composition comprising a resinous condensate according to the invention and a crystalline fiber-forming polypropylene such as polypropylene consisting essentially of isotactic macromolecules, as disclosed by Natta et al. in U.S. Pat. No. 2,882,263.

The melt-spinning of the composition of the invention is facilitated by adding to the composition a minor amount, preferably from 0.1% to 5% by weight, of a solid dispersing agent to assist the homogeneous dispersion of the resinous condensation product in the polymer mass. Very suitable dispersing agents are, for example, cetyl and stearyl alcohol, stearic acid, terephthalic acid, benzoin, furoin, vinyl stearate, mono-, di- and tristearic esters of glycerol, mono-ethanolamine, stearate, stearamide, N-diethanol lauramide, $C_6$ to $C_{30}$ aliphatic amines, condensation products of ethylene oxide with alcohols, amines and phenols, poly-stearamide, polyacrylic acid, polystyrene, styrene copolymers and terpene polymers. Other additives generally used in melt-spinning compositions such as, for example, opacifiers and stabilizers, can also be added. The compositions can be melt-spun to obtain monofilaments or a plurality of finer filaments which can be used for preparing continuous filament yarns or which can be converted to short or staple fibers suitable for use alone or in combination with other fibers to produce a spun yarn.

The filaments are preferably stretched after formation to obtain filaments having a ratio of length of stretched filament to length of unstretched filament of from about 2:1 to 10:1. This stretching can be carried out at a temperature within the range of about 80° C. to 150° C. and in an apparatus heated with hot air, steam or similar heating medium. The filaments are also preferably treated before or after the stretching with agents which increase the water-insolubility of the resinous condensate. Such agents are compounds which can condense with either the amine or epichlorhydrin residue in the condensation product to form a higher molecular weight compound. Whether or not a particular compound which is known to react with epichlorhydrin or with amines can be used as an agent to render the condensation products of the invention more water-insoluble can be readily determined by means of a simple test in which the fiber is treated with the agent and the leaching effect of water on the treated fiber is then measured. This result can be compared with that obtained from water leaching of an untreated fiber. Examples of such water-insolubilizing agents are formaldehyde, isocyanates, di-epoxy compounds and cross-linking agents such as, for example, divinyl benzene.

The fibers obtained from compositions of the invention can be dyed with acid dyes or with those dyes known as the "acetate type dyes," i.e., those suitable for cellulose acetate. The fibers also have a good affinity for basic dyes, metallized dyes, plastosoluble dyes and vat dyes.

Fibers which have been produced according to this invention from fiber-forming crystalline polypropylene not only have improved dye receptivity so that greater color fastness is achieved, but also retain the properties of mechanical and chemical resistance characteristic of fibers formed from the crystalline polypropylene.

Compositions according to the invention may also be formed into dyeable fibers or other articles by dry- and wet-spinning and casting methods. For instance, in the case of the acrylonitrile polymers, which are not adapted to melt extrusion, the resinous condensate can be mixed with polyacrylonitrile or with a suitable acrylonitrile copolymer, and the mixture can then be dispersed in a suitable spinning solvent which may be dimethylformamide, γ-butyrolactone, ethylene carbonate, or another solvent for acrylonitrile polymers. Also the epichlorhydrin and amine can be separately dissolved in the spinning solvent, in which the acrylonitrile polymer is then dispersed.

In either embodiment, the dispersion is heated to obtain a spinning solution. Solid dispersing agent can be included in the spinning solutions and fibers obtained from the solutions can be stretched and treated with agents which react with one or the other component of the resinous condensate to render the latter insoluble in water.

The following examples are intended to illustrate the invention without limiting its scope.

EXAMPLE 1

1,345 g. octadecylamine, 925 g. epichlorhydrin and 1000 g. 95% ethyl alcohol were introduced into a 6 liter 3-necked flask provided with a mercury-valve agitator, a thermometer and a reflux condenser.

The mass was heated to about 85° C. while agitating for 8 hours. 954 g. hexamethylenediamine were then added.

The heating was continued for 4 hours. After cooling to 60° C., 400 g. of sodium hydroxide pellets were added. The mixture was agitated for 2 hours at 60° C. and the sodium chloride thus formed was filtered while the mixture was still warm.

Ethyl alcohol was distilled off under reduced pressure, leaving a solid residue which was ground and sieved.

Solubility of the condensation product

[The condensation product had the following solubility characteristics at 25° C.]

| Solvent | Dissolved product, g./100 cc. solvent, percent | Dissolved product, g./100 g. solvent, percent |
|---|---|---|
| Hydrocarbons: | | |
| Benzene | 1.100 | 1.250 |
| Petroleum ether | 4.500 | 6.700 |
| Heptane | 8.700 | 12.65 |
| Vaseline oil | 0.001 | |
| Petroleum | 0.080 | 0.100 |
| Tetrahydronaphthalene | 4.700 | 4.850 |
| Alcohols: | | |
| Methyl alochol | 0.110 | 0.140 |
| Ethyl alcohol | 1.300 | 1.640 |
| Cyclohexanol | 1.500 | 1.570 |
| Ketones: | | |
| Acetophenone | 0.530 | 0.515 |
| Acetone | 0.500 | 0.630 |
| Cyclohexanone | 1.300 | 0.320 |
| Methylethylketone | 1.016 | 0.200 |
| Ethers: Dioxane | 0.110 | 0.100 |
| Esters: Ethyl acetate | 1.900 | 2.120 |
| Halogen derivatives: | | |
| Chloroform | 4.100 | 2.750 |
| Tetrachloroethylene | 9.500 | 5.820 |
| Carbon tetrachloride | 5.070 | 3.200 |
| Trichloroethylene | 3.500 | 2.420 |
| Nitriles: Acrylonitrile | 0.060 | 0.070 |
| Acids: | | |
| Acetic acid | 4.500 | 4.280 |
| Thioglycolic acid | 3.200 | |
| Sulphides: Carbon disulphide | 0.001 | 0.001 |
| Amides: Dimethylformamide | 0.100 | 0.110 |
| Nitrogen bases: Pyridine | 5.180 | 5.270 |
| Nitroderivatives: Nitrobenzene | 0.005 | 0.004 |
| Lactones: γ-Butyrolactone | 0.005 | |
| Amino alcohols: Monoethanolamine | 0.005 | 0.004 |
| Inorganic compounds: | | |
| Water | 0.020 | 0.020 |
| Hydrochloric acid | 0.001 | 0.001 |
| Sulphuric acid | 0.130 | 0.072 |
| 30% ammonia | 0.200 | 0.225 |
| 20% sodium hydroxide | 0.001 | 0.001 |

The following substances were found to be good solvents for the condensate, at their boiling point: benzene, petroleum ether, heptane, methyl alcohol, ethyl alcohol, cyclohexanol, cyclohexanone, methylethylketone, dioxane, ethyl acetate, chloroform, tetrachloroethylene, carbon tetrachloride, trichloroethylene, acrylonitrile, acetic acid, pyridine and carbon disulphide.

Determination of the melting point

The melting point was determined under a microscope provided with a heating plate.

The value reported in the table is the average of 3 determinations:

| Sample: | Melting point, °C. |
| --- | --- |
| 1 | 52 |
| 2 | 52 |
| 3 | 51 |
| 4 | 52 |
| 5 | 52 |
| 6 | 52 |

Determination of the specific viscosity

The value of the specific viscosity ($\eta_{spec.}$) was determined on a 5% benzene solution of the condensation product at a temperature of 25° C. The viscosimeters used were of the 100 Fenske type.

The following values were found:

| Samples: | $\eta_{spec.}$ |
| --- | --- |
| 1 | 0.338 |
| 2 | 0.338 |
| 3 | 0.333 |
| 4 | 0.297 |
| 5 | 0.298 |
| 6 | 0.305 |

Determination of the molecular weight by cryoscopy

The molecular weight was also determined by cryoscopy with a device employing a Beckmann thermometer. Only the molecular weight of sample 1 could be determined in this way (molecular weight of about 4000) while that of the other samples could not be determined probably because their molecular weight is outside the sensitivity limits of the apparatus used. No decrease of freezing point detectable with the Beckmann termometer was in fact observed.

EXAMPLE 2

18.5 g. (0.1 mol) n-dodecylamine, 18.6 g. (0.2 mol) epichlorhydrin and 30 cc. ethyl alcohol were introduced into a 200 cc. 3-necked flask provided with a mercury valve agitator, thermometer and reflux condenser. The mass was refluxed (at about 80° C.) while agitating for 6 hours.

7.4 g. (0.1 mol) 1,2-propylenediamine were then added and heating continued for 3 hours. In order to isolate the resinous condensation product, the solvent was evaporated by distillation at reduced pressure.

The water solubility of the obtained condensate was 0.030%.

The ethanol solution of the condensation product obtained (44.4 g. dry substance) was mixed with 300.6 g. (90%) crystalline polypropylene, prepared with stereospecific catalysts, having an intrinsic viscosity [$\eta$] of 1.4 (determined in tetrahydronaphthalene at 135° C.), a residue after heptane extraction of 94% and an ash content of 0.055%. The mixture was heated in an oven in order to remove ethyl alcohol, and then spun in a melt-spinning device under the following conditions:

Spinneret: 1/0.8 x 16 mm.
Extrusion temperature: 190° C.
Pressure: 4.8 kg./cm.$^2$
Winding speed: 380 m./minute The fibers obtained were stretched to a stretching ratio (i.e. a ratio of length of unstretched fiber to stretched fiber) of 1:4.5 at 130° C. The stretched fibers were dyed to shades of a good intensity and fastness with the following dyes:

Solid yellow 2 G (C.I. Direct Yellow 11) (acid)
Wool red B (C.I. Acid Red 15) (acid)
Alizarine blue ACF (acid)
Acid Black IVS (C.I. Acid Black 1) (acid)
Lanasyn red 2GL (C.I. Acid Red 216) (metallized)
Setacyl yellow 3G (C.I. Disperse Yellow 20) (acetate)
Cibacet scarlet BR (C.I. Disperse Red 18) (acetate)
Acetoquinone blue RHO (acetate)

The shades obtained were more fast if, before dyeing, the fibers were treated with formaldehyde, i.e., by boiling them with a 5% aqueous formaldehyde solution for 10 minutes, followed by drying.

Another mixture was prepared from 93% of the polypropylene and 7% of the condensation product.

The mixture thus obtained was spun in a melt-spinning device under the following conditions:

Spinneret: 1/0.8 x 16 mm.
Extrusion temperature: 190° C.
Pressure: 7.8 kg./cm.$^2$
Winding speed: 380 m./min.

The fibers obtained, after stretching, where dyed to shades of good intensity and fastness with the aforementioned dyes.

EXAMPLE 3

18.5 g. (0.1 mol) n-dodecylamine, 18.5 g. 0.2 mol) epichlorhydrin and 30 cc. ethyl alcohol were introduced into a 200 cc. 3-necked flask provided with a mercury valve agitator, a thermometer and a reflux condenser. The mass was refluxed (at about 80° C.) while agitating for 6 hours.

10.3 g. (0.1 mol) diethylene triamine were then added and the heating was continued for 3 hours.

After cooling, the ethanol solution of the condensation product (water solubility=0.015%) obtained (47.3 g. dry product) was mixed with 628.4 g. (93% by weight) of crystalline polypropylene prepared with the aid of stereospecific catalysts and having an intrinsic viscosity [$\eta$] of 1.4, a residue after heptane extraction of 94% and an ash content of 0.055%.

The mixture was heated in an oven to remove ethyl alcohol, and then melt-spun under the following conditions:

Spinneret: 1/0.8 x 16 mm.
Extrusion temperature: 200° C.
Pressure: 6.4 kg./cm.$^2$
Winding speed: 380 m./min.

The fibers obtained, after being stretched to a ratio of 1:5 at 130° C., were dyed to shades of a good intensity and fastness with the dyes used in the preceding examples.

The shades were even more fast if the fibers were treated with a 5% aqueous hexamethylene diisocyanate solution at room temperature and then dried prior to being dyed.

EXAMPLE 4

185 g. (1 mol) n-dodecylamine, 185 g. (2 mols) epichlorhydrin and 300 cc. ethyl alcohol were introduced into a 2 liter 3-necked flask provided with a mercury valve agitator, a thermometer and a reflux condenser.

The mass was refluxed (about 80° C.) while agitating for 6 hours. 189 g. (1 mol) tetraethylenepentamine were added and heating was continued for 3 hours. After cooling, the ethanol solution of the condensation product (water solubility=0.018%) obtained (559 g. dry product) was mixed with 7,427 g. (93%) of crystalline polypropylene prepared with the aid of stereospecific catalysts and having an intrinsic viscosity [$\eta$] of 1.00, a residue after heptane extraction of 92.8% and an ash content of 0.095%. The mixture was dried in an oven to remove ethyl alcohol and then spun in a melt-spinning device under the following conditions:

Screw temperature: 240° C.
Head temperature: 210° C.
Spinneret temperature: 200° C.
Spinneret type: 60/0.8 x 16 mm.
Pressure: 20 kg./cm.$^2$
Winding speed: 250 m./min.

The yarns obtained were stretched at 160° C. to a stretching ratio of 1:5.3. The serimetric characteristics of the fibers obtained are:

Tenacity: 3.47 g./den.
Elongation: 28.4%

On the fibers obtained, shades of a good intensity and fastness were produced with the dyes used in Example 2.

The shades were more fast if, before being dyed, the fibers were immersed in a 10% aqueous solution of ethylene glycol-diglycidyl ether for 10 minutes at room temperature and then dried.

EXAMPLE 5

26.9 g. (0.1 mol) n-octadecylamine, 18.5 g. (0.2 mol) epichlorhydrin and 40 cc. ethanol were introduced into a 200 cc. 3-necked flask provided with a mercury valve agitator, a thermometer and a reflux condenser. The mass was refluxed (at about 80° C.) while agitating for 8 hours. 18.9 g. (0.1 mol) tetraethylpentaamine were then added and heating was continued for 3 hours.

The solvent was evaporated by vacuum distillation; the product condensation (water solubility=0.020%) (64.3 g.) was powdered and mixed with 854.3 g. (93%) of crystalline polypropylene prepared with stereospecific catalysts and having an intrinsic viscosity $[\eta]$ of 1.4, a residue after heptane extraction of 94% and an ash content of 0.055%.

The mixture was spun in a melt-spinning device under the following conditions:

Spinneret: 1/0.8 x 16 mm.
Extrustion temperature: 200° C.
Pressure: 6.4 kg./cm.$^2$
Winding speed: 380 m./min.

On the fibers obtained, stretched to a ratio of 1:6 at 120° C. shades of a good intensity and fastness were produced with acid and acetate dyes, more particularly with the dyes used in Example 2.

EXAMPLE 6

18.5 g. (0.1 mol) n-dodecylamine, 18.5 g. (0.2 mol) epichlorhydrin and 30 cc. ethyl alcohol were introduced into a 200 cc. 3-necked autoclave provided with a mercury valve agitator, a thermometer and a reflux condenser. The mass was refluxed (at about 75° C.) while agitating for 6 hours.

11.6 g. (0.1 mol) hexamethylenediamine were then added and the heating was continued for 3 hours.

The ethanol solution of the condensation product obtained (water solubility=0.034%) (48.6 g. dry product) was mixed with 645.7 g. (93%) of crystalline polypropylene prepared with stereo-specific catalysts, and having an intrinsic viscosity $[\eta]$ of 1.4, a residue after heptane extraction of 94% and an ash content of 0.55%. The mixture was dried in an oven to remove ethyl alcohol and then spun in a melt-spinning device under the following conditions:

Spinneret: 1/0.8 x 16 mm.
Pressure: 6.4 kg./cm.$^2$
Extrustion temperature: 190° C.
Winding speed: 380 m./min.

On the fibers thus obtained, stretched to a ratio of 1:7.5 at 130° C., shades of good intensity and fastness were produced with acid dyes and acetate dyes, more particularly with those used in Example 2.

EXAMPLE 7

An ethanol solution of the condensation product of Example 6, containing 48.6 g. dry product, was mixed with 645.7 g. (93%) of crystalline polyethylene having a molecular weight of about 50,000 prepared under a low pressure. The solvent was then removed by drying in an oven and the mixture spun in a melt-spinning device under the following conditions:

Spinneret: 1/0.8 x 16 mm.
Extrustion temperature: 210° C.
Pressure: 6.4 kg./cm.$^2$
Winding speed: 360 m./min.

On the fibers obtained, stretched at 95° C. to a ratio of 1:3, shades having a good intensity and fastness were obtained with acid dyes and acetate dyes.

EXAMPLE 8

Into a 6-liter 3-necked flask, provided with a mercury valve agitator, a thermometer and a reflux condenser, the following compounds were introduced:

Octadecylamine: 1,345 g.
Epichlorhydrin: 925 g.
95% ethyl alcohol: 1,300 g.

The mass was heated at about 80° C. while agitating for 4 hours. 580 g. hexamethylenediamine were then added and the heating was continued for 2 hours. An alcohol portion (500 g.) was then distilled off under ordinary pressure. The remaining alcohol was removed by drying in a vacuum drier at 60° C. under a residual pressure of 5–10 mm.

A solid product having a water solubility of 0.025%, which was ground and sieved, was obtained. By analysis the product showed a nitrogen content of 6.93%. A mixture consisting of 7% of the product and 93% of crystalline polypropylene (having an intrinsic viscosity $[\eta]$ of 1.15, a residue after heptane extraction of 94.01% and an ash content of 0.12%) was prepared.

The mixture was granulated at 150° C. in a screw extruder. It was then spun in a melt-spinning device under the following conditions:

Screw temperature: 200° C.
Head temperature: 180° C.
Spinneret temperature: 170° C.
Spinneret type: 60/0.8 x 16 mm.
Pressure: 22 kg./cm.$^2$
Winding speed: 250 m./min.

The fibers obtained were stretched at 150° C. in the presence of steam to a stretching ratio of 1:6.3.

The serimetrical characteristics of the fibers were as follows:

Tenacity: 4.98 g./den.
Elongation: 24%

The stretched fibers were dyed to shades of a good intensity and fastness with acid dyes or acetate dyes, more particularly with those mentioned in Example 2.

EXAMPLE 9

Into a 6-liter 3-necked flask, provided with a mercury valve agitator, a thermometer and a reflux condenser, the following substances were introduced:

Octadecylamine: 1,345 g.
Epichlorhydrin: 925 g.
95% ethyl alcohol: 1,300 g.

The mass was heated to about 80° C. while agitating for 4 hours.

290 g. hexamethylenediamine and 365 g. triethylene tetramine were then added. The heating was continued for 2 hours. A portion of the alcohol (500 g.) was distilled off under ordinary pressure. The remaining alcohol was removed by drying in a vacuum drier at 60° C. under a residual pressure of 5–10 mm.

A solid product having a water solubility of 0.015% was obtained which was ground and sieved. A mixture of 5% of the product and 95% of crystalline polypropylene (having an intrinsic viscosity $[\eta]$ of 1.15, a residue after heptane extraction of 94.01% and an ash content of 0.12%) was prepared.

This mixture was granulated at 150° C. in a screw extruder. It was then spun in a melt-spinning device under the following conditions:

Screw temperature: 200° C.
Head temperature: 200° C.
Spinneret temperature: 190° C.
Spinneret type: 60/0.8 x 16 mm.
Pressure: 20 kg./cm.$^2$
Winding speed: 250 m./min.

The fibers obtained were stretched at 150° C. in the presence of steam, to a stretching ratio of 1:5.3.

The serimetrical characteristics of the fibers were as follows:

Tenacity: 4.79 g./den.
Elongation: 22%

These fibers, when exposed to the U.V. rays of a 100 watt mercury vapor lamp placed 10 cm. above them, underwent a reduction of 25% of their initial intensity after exposure for 40 hours; similar fibers prepared from the same polymer but without any addition of the condensate, underwent a reduction of 25% of their initial intensity after exposure to the mercury vapor lamp for 10 hours under the same conditions.

On these fibers, shades of a good intensity and fastness were produced with acid dyes and acetate dyes, more particularly with the dyes used in Example 2.

EXAMPLE 10

1,508 g. hexamethylenediamine were dissolved in 2,500 g. 95% ethyl alcohol at room temperature in a 6-liter flask while agitating. After cooling to 2–3° C., 925 g. epichlorhydrin were added. Agitation was continued for 2 hours at 5–10° C. and the temperature was then slowly raised to 80° C. The reaction was continued at this temperature for 4 hours. 400 g. sodium hydroxide were added drop-wise, followed by heating at 80° C. for 1 hour. The reaction mixture was then placed in a Hofer type pressure-resistant 5000 cc. autoclave provided with agitator, electric heating means, manometer and thermometer. 1150 g. octadecyclchloride were added and the mixture was heated at 150–170° C. for 12 hours. After cooling to 60° C., 160 g. sodium hydroxide were added dropwise. After further heating at 80° C. for 1 hour while agitating, the sodium chloride formed was filtered while the mixture was still warm. To the alcohol solution of the obtained condensation product (water solubility =0.022%, 48 kg. of crystalline polypropylene$[\eta]$ 1.3, ash content 0.03%, residue after heptane extraction 94.7%) were added. Alcohol was removed by drying at 60° C. in a mixer provided with a vacuum pump. The product was granulated by extrusion in a screw device at 160° C. The granulate was melt spun in a device of the type described in the previous examples under the following conditions:

Spinneret type: 60/0.8 x 16 mm.
Screw spinneret: 230° C.
Head temperature: 220° C.
Spinneret temperature: 210° C.
Highest pressure: 22 kg./cm.$^2$
Winding speed: 312 m./min.

The yarn leaving the spinneret was wet with a 10% aqueous ethylene glycol-diglycidyl ether solution (containing also 1 g./l. condensation product of 10 mols ethylene oxide with 1 mol octyl phenol) as described in the previous examples. It was stretched (in the presence of steam) to a stretching ratio of 1:6.3 and was then crimped and cut.

The serimetrical characteristics of the yarn were as follows:

Tenacity: 3.24 g./den.
Elongation: 28%

The yarn was dyed with the following acid, metallized, plastosoluble and vat dyes, obtaining shades with a high intensity and a good fastness to washing, rubbing and light:

Solid yellow 2G (C.I. Direct Yellow 11) (acid)
Wool red B (C.I. Acid Red 15) (acid)
Alizarine blue ACF (acid)
Acid black IVS (C.I. Acid Black 1) (acid)
Lanasyn red 2 GL (C.I. Acid Red 216) (metallized)
Diachrome yellow 2G (C.I. Mordant Yellow 10) (chromium)
Setacyl yellow 3G (C.I. Disperse Yellow 20) (plastosoluble)
Cibacet scarlet BR (C.I. Disperse Red 18) (plastosoluble)
Acetoquinone blue RHO (plastosoluble)
Romantrene yellow GCN (C.I. Vat Yellow 2) (vat)
Romantrene brilliant pink R (C.I. Vat Red 1) (vat)
Romantrene brilliant blue R (C.I. Vat Blue 4) (vat)

EXAMPLE 11

Four condensation products were prepared by procedures in accordance with that in Example 10, with the reactants and molar ratios reported in the following table, and spun into fibers under the spinning conditions set forth in the table. On the fibers thus obtained, highly intense shades with a good fastness to washing, rubbing and light were obtained with the dyes used in Example 10.

Synthesis of the Resinous Condensation Product

| | | | | |
|---|---|---|---|---|
| Epichlorhydrin | 925 g. (1 mol). | 925 g. (1 mol). | 925 g. (1 mol). | 925 g. (1 mol). |
| Poly-amine | Hexamethylene diamine, 1,508 g. (1.3 mols). | Hexamethylene diamine, 1,392 g. (1.2 mols). | Hexamethylene diamine, 1,572 g. (1.2 mols). | Hexamethylene diamine, 1,508 g. (1.3 mols). |
| Alkylating agent | Cetyl chloride, 1,303 g. (0.5 mol). | Lauryl chloride, 1,023 g. (0.5 mol). | Octadecyl chloride, 1,443 g. (0.5 mol). | Benzyl chloride, 633 g. (0.5 mol.) |
| Water solubility | 0.025% | 0.035% | 0.015% | 0.025%. |

Preparation of Yarns From Mixes of Crystalline Fiber-forming Polypropylene and 6% Condensation Product

| | | | | |
|---|---|---|---|---|
| Polypropylene, $\eta$ | 1.3 | 1.3 | 1.3 | 1.3 |
| Ash content, percent | 0.067 | 0.067 | 0.067 | 0.067 |
| Residue after heptane extraction | 95.5 | 95.5 | 95.5 | 95.5 |
| Spinneret (mm.) | 60=0.8×16 | 60=0.8×16 | 60=0.8×16 | 60=0.8×16 |
| Screw temperature (° C.) | 230 | 230 | 230 | 230 |
| Head temperature (° C.) | 220 | 220 | 220 | 220 |
| Spinneret temperature (° C.) | 210 | 210 | 210 | 210 |
| Highest pressure (kg./cm.$^2$) | 22 | 17 | 28 | 21 |
| Winding speed (m./min.) | 270 | 230 | 250 | 220 |
| Sizing | Ethylene glycol-diglycidyl ether in a 10% solution (in the presence of 1 g./l surface active agent of Example 10). | | | |
| Stretching ratio (in the presence of steam) | 1:6.2 | 1:6 | 1:6.3 | 1:5.3 |
| Yarn tenacity (g./den.) | 3.21 | 3.78 | 3.83 | 3.21 |
| Elongation | 28 | 25 | 22 | 21 |

Similar results were obtained from polyethylene and crystalline polybutene-1 prepared with stereospecific catalysts.

EXAMPLE 12

108 g. (0.4 mol) octadecyclamine were introduced into a 1 liter 3-necked flask provided with a mercury value agitator, a thermometer and a reflux condenser. The amine was kept at 70° C. 24 g. (0.4 mol) glacial acetic acid were added in order to form the amine salt.

Immediately thereafter 37 g. (0.4 mol) epichlorhydrin were added. The mass was then heated at 110° C. for 90 minutes.

After cooling to 40° C., 300 cc. methanol were added. 86 g. (2 mols) anhydrous ethyleneimine were added and the mixture refluxed for 6 hours. It was then cooled to 30° C. and 44.9 g. (0.8 mol) potassium hydroxide were added. After refluxing for 2 hours, the solvent was removed by vacuum distillation and the condensation product thus obtained was extracted with n-heptane.

The condensate having a water solubility of 0.028% was obtained as a solid substance by removing the solvent by vacuum distillation, in a yield of 83% on the products used.

A mixture was prepared from 150 g. of the condensate produced as described above and 2850 g. crystalline polypropylene prepared with the aid of sterospecific catalysts and having an intrinsic viscosity of 1.42 (determined in tetrahydronaphthalene at 135° C.), a residue after heptane extraction of 93.4% and an ash content of 0.26%.

The mixture was a spun in a melt-spinning device under the following conditions:

Screw temperature: 230° C.
Head temperature: 220° C.
Spinneret temperature: 210° C.
Spinneret type: 60/0.8 x 16 mm.
Pressure: 22 kg./cm.$^2$
Winding speed: 250 m./min.

The fibers obtained, stretched at 150° C. in the presence of steam to a stretching ratio of 1:6, have the following serimetric characteristics:

Tenacity: 4.07 g./den
Elongation: 22%

On these fibers, shades with a good intensity and fastness were obtained with the following dyes:

Solid yellow 2G (C.I. Direct Yellow 11) (acid)
Wood red B (C.I. Acid Red 5 (acid)
Alizarine blue ACF (acid)
Acid black IVS (C.I. Acid Black 1) (acid)
Lanarsyn red 2GL (C.I. Acid Red 216) (metallized)
Setacyl yellow 3 G (C.I. Disperse Yellow 20 (plastosoluble)
Cibacet scarlet BR (C.I. Disperse Red 18) (plastosoluble)
Acetoquinone blue RHO (plastosoluble)

EXAMPLE 13

108 g. (0.4 mol) octadecylamine and 100 cc. methanol were introduced into a 1 liter 3-necked flask provided with a mercury valve agitator, a thermometer and a reflux condenser.

After heating until the amine was dissolved, 37 g. (0.4 mol) epichlorhydrin were slowly added and the mixture heated at 60° C. for 2 hours. The mass was then cooled to 30° C., 86 g. (2 mols) anhydrous ethyleneimine added and the whole mixture refluxed for 4 hours. After cooling to 30° C., 22.45 g. (0.4 mol) potassium hydroxide were added and the mixture refluxed for 2 hours.

The sodium chloride thus formed was removed by filtering the warm mass; and the solvent was removed by vacuum distillation.

The yield, calclated on the materials used, was 95%.

A mixture was prepared from 150 g. of the condensate (having a water solubility of 0.021%) prepared as described above and 2850 g. of crystalline polypropylene prepared with the aid of sterospecific catalysts and having an intrinsic viscosity of 1.3, a residue after heptane extraction of 97.5% and an ash content of 0.059%. The mixture was spun in a melt-spinning device under the following conditions:

Screw temperature: 230° C.
Head temperature: 220° C.
Spinneret temperature: 200° C.
Spinneret type: 60/0.8 x 16 mm.
Pressure: 27 kg./cm.$^2$
Winding speed: 270 m./min.

The fibers thus obtained, stretched in the presence of steam at 150° C. to a stretching ratio of 1:5.3, had the following serimetric characteristics:

Tenacity: 3.81 g./den
Elongation: 26%

On these fibers, shades having a good intensity and fastness were obtained with the dyes used in Example 12.

EXAMPLE 14

74 g. (0.4 mol) dodecylamine and 100 cc. methanol were introduced into a 1-liter 3-necked flask provided with a mercury valve agitator, a thermometer and a reflux condenser.

37 g. (0.4 mol) epichlorhydrin were slowly added and the mass heated at 60° C. for 2 hours, cooled to 30° C. and, after addition of 86 g. (2 mols) anhyrous ethyleneimine, was refluxed for 4 hours. The mass was then cooled to 36° C. and 22.45 g. (0.4 mol) potassium hydroxide were added. After refluxing for 2 hours, the sodium chloride formed was filtered from the warm mass, and the solvent was removed by vacuum distillation. The yield, calculated on the materials used, was 91%. The condensate had a water solubility of 0.032%.

A composition was prepared from 120 parts by weight of the condensate produced as described above and 2880 parts of crystalline polypropylene prepared with the aid of stereospecific catalysts and having an intrinsic viscosity of 1.3, a residue after heptane extraction of 97.5% and an ash content of 0.059%.

This composition was spun in a melt-spinning device under the following conditions:

Screw temperature: 230° C.
Head temperature: 220° C.
Spinneret temperature: 200° C.
Spinneret type: 60/0.8 x 16 mm.
Pressure: 25 kg./cm.$^2$
Winding speed: 280 m./min.

The fibers obtained, stretched in the presence of steam at 150° C. to a stretching ratio of 1:5.3, had the following serimetric characteristics:

Tenacity: 3.7 g./den
Elongation: 28%

On these fibers, shades with a good intensity and fastness were produced with the dyes used in Example 12.

EXAMPLE 15

104.2 g. (0.2 mol) dioctadecylamine, $(C_{18}H_{37})_2NH$, were introduced into a 1 liter 3-necked flask provided with a mercury valve agitator, a thermometer and a reflux condenser. The mass was heated to its melting point and 18.5 g. (0.2 mol) epichlorhydrin were slowly added. The mass was then heated at 95° C. for 3 hours and then cooled to 30–40° C. 200 cc. 95% ethanol and 86 g. (2 mols) ethyleneimine were added. After refluxing for 4 hours, the solvent was evaporated by vacuum distillation. A solid condensate was obtained in a yield of 98%. The condensate had a water solubility of 0.010%.

A mixture was prepared from 150 parts by weight of a condensate prepared as described above and 2850 parts of crystalline polypropylene prepared with stereospecific catalysts and having an intrinsic viscosity of $[\eta]$ of 1.4, a residue after heptane extraction of 93.4% and an ash content of 0.026%.

This composition or blend was spun in a melt-spinning device under the following conditions:

Screw temperature: 230° C.
Head temperature: 220° C.
Spinneret temperature: 210° C.
Spinneret type: 60/0.8 x 16 mm.
Pressure: 21 kg./cm.²
Winding speed: 230 m./min.

The fibers obtained, stretched at 150° C. in steam to a stretching ratio of 1:5.3, had the following serimetric characteristics:

Tenacity: 3.12 g./den
Elongation: 25%

On these fibers, intense, fast shades were produced with the dyes used in Example 12.

EXAMPLE 16

A mixture prepared from 150 parts by weight of the condensate of Example 13 and 2850 parts of the crystalline polypropylene used in Example 13 was spun in a melt-spinning device under the following conditions:

Screw temperature: 230° C.
Head temperature: 220° C.
Spinneret temperature: 200° C.
Spinneret type: 60/0.8 x 16 mm.
Pressure: 27 kg./cm.²
Winding speed: 270 m./min.

Immediately before winding, the yarn was wet with 15% ethylene glycol-diglycidyl ether aqueous solution and was then stretched in stream to a stretching ratio of 1:5.3.

The fibers obtained were dyed to intense and particularly fast (against wet washing and rubbing) shades with the dyes used in Example 12.

EXAMPLE 17

The following materials were introduced into a 6 liter 3-necked flask provided with a mercury valve agitator, a thermometer and a reflux condenser:

Octadecylamine: 1345 g.
Epichlorhydrin: 925 g.
95% ethyl alcohol: 2270 g.

The mass was heated at about 85° C. while agitating for 8 hours, 580 g. hexamethylenediamine were then added, and the heating continued for 4 hours. A portion of the alcohol (about 1200 g.) was distilled off at ordinary pressure. The remaining alcohol was removed by drying in a vacuum drier at 60° C. under a residual pressure of 5-10 mm. The solid product which was obtained was ground and sieved. By analysis it had a nitrogen content of 7.03%. The product had a water solubility of 0.030%.

A mixture consisting of 10° of the above condensate and 90% polyacrylonitrile having a molecular weight of 71,500 was prepared. 10 kg. of this mixture were dispersed in 32 kg. dimethylformamide at room temperature. The dispersion was then converted into a spinning solution by passing it through a dissolving tube nest heat-exchanger kept at 100–120° C. and was finally dry spun at 80° C. to obtain fibers.

The fibers obtained were subjected to steam stretching at 150–160° C. at a stretching ratio of 1:5. They were then subjected to a treatment with water at 100° C. (in order to stabilize the fibers dimensionally) and then to mechanical crimping, vaporization at 105° C. for 1 hour, sizing, cutting and drying.

The fibers thus obtained had the following serimetric characteristics:

Tenacity: 3.2 g./den
Elongation: 27%

With the following dyes intense fast shades were obtained on the fibers:

Solid yellow 2G (C.I. Direct Yellow 11) (acid)
Wool red B (C.I. Acid Red 15) (acid)
Alizarine blue ACF (acid)
Acid black IVS (C.I. Acid Black 1) (acid)
Lanasyn red 2GL (C.I. Acid Red 216) (metallized)
Setacyl yellow 3G (C.I. Disperse Yellow 20) (plastosoluble)
Cibacet scarlet BR (C.I. Disperse Red 18) (plastosoluble)
Acetoquinone blue RHO (plastosoluble)
Crystal green CX (basic)
Basic fucsine (C.I. Basic Violet 14) (basic)

EXAMPLE 18

The following ingredients were introduced into a 2 liter 3-necked flask provided with a mercury valve agitator, a thermometer and a reflux condenser:

n-dodecylamine: 185 g.
Epichlorhydrin: 185 g.
95% ethyl alcohol: 370 g.

The mixture was refluxed (at 75–80° C.) for 8 hours while agitating. 60 g. ethylene diamine were added. The heating was continued for 4 hours. A 30% aqueous sodium hydroxide solution was added in order to neutralize the hydrochloric acid formed in the reaction. The sodium chloride formed was decanted from the solution. Lastly, all the alcohol present was distilled off under ordinary pressure and the drying completed in a vacuum drier at 60° C. under the residual pressure of 5-10 mm.

The solid product obtained was ground and sieved; by analysis it had a nitrogen content of 10.7%. The product had a water solubility of 0.027%.

300 g. of the condensate thus obtained were dissolved in 9.5 kg. dimethylformamide at 60° C. The solution was cooled to ordinary temperature and 2.7 kg. of a copolymer of acrylonitrile with methylmethacrylate in the ratio of 95:5 and having a molecular weight of 70,500 were added. The dispersion was converted into a spinning solution by passing it through a dissolving tube nest heat-exchanger at 100–120° C., it was then dry spun at 80° C.

The fibers thus obtained were stretched on a hot plate, at 150–160° C. at a stretching ratio of 1:5.

The fibers had the following characteristics:

Tenacity: 3.12 g./den
Elongation: 21%

Intense, fast shades were obtained on these fibers with the dyes used in Example 17.

EXAMPLE 19

A solution of 5 kg. of the condensate of Example 18 in 400 kg. dimethylformamide at 60° C. was prepared.

The solution was cooled to ordinary temperature and 95 kg. of an acrylonitrile-ethyl acrylate copolymer were dispersed therein. The molecular weight of the copolymer was 67,300, the ratio of acrylonitrile to ethyl acrylate being 98:2. The dispersion was converted into a spinning solution by passing it through a dissolving tube nest heat-exchanger at 100–120° C. It was then dry spun at 80° C.

The fibers obtained were stretched in the presence of steam at 160° C. to a stretching ratio of 1:5. The stretched fibers had the following characteristics:

Tenacity: 0.01 g./den
Elongation: 23%

Intense fast shades were obtained on these fibers with the dyes used in Example 17.

Having thus described our invention, what we desire to secure by Letters Patent and hereby claim is:

1. A resinous condensation product having a water solubility at 25° C. of between about 0.01 and 0.034 percent by weight, comprising a condensate of epichlorohydrin with an aliphatic polyamine containing from 2 to 60 carbon atoms, said condensate having been modified by reaction with an alkyl or aryl halide, the molar ratio between said epichlorohydrin and said polyamine being between 1:1.2 and 1:1.5.

2. The condensation product of claim 1 wherein said polyamine is selected from the group consisting of ethylene diamine, hexamethylene diamine, tetraethylene pentamine, 1,2-propylene diamine and dipropylene triamine.

3. The condensation product of claim 1 wherein said alkyl or aryl halide is selected from the group consisting of lauryl chloride, cetyl chloride, octadecyl chloride and benzyl chloride.

4. A dyeable composition comprising a crystalline synthetic homopolymer or copolymer of a monomer selected from the group consisting of ethylene, propylene, butene-1 and acrylonitrile, and from about 1% to about 25% by weight thereof of a resinous condensation product having a water solubility at 25° C. of between about 0.01 and 0.034 percent by weight, said product being a condensate of (a) epichlorohydrin and an aliphatic monoamine, said condensate having been modified by reaction with an aliphatic polyamine or an aliphatic imine, the molar ratio of epichlorohydrin to monoamine being within the range from about 1:1 to 5:1 and the molar ratio of said polyamine or imine to said monoamine being within the range from about 0.1:1 to 10:1, said monoamine being selected from the group consisting of primary amines containing from 3 to 30 carbon atoms and secondary amines containing from 4 to 60 carbon atoms or (b) epichlorohydrin and an aliphatic polyamine containing from 2 to 60 carbon atoms, said condensate having been modified by reaction with an alkyl or aryl halide, the molar ratio of epichlorohydrin to polyamine being within the range from about 1:1.2 to 1:1.5.

5. A spinnable blend comprising the composition of claim 4 and from 0.1% to 5% by weight of said composition of a solid dispersing agent.

6. The spinnable blend of claim 5 wherein said dispersing agent is selected from the group consisting of cetyl alcohol, stearyl alcohol, stearic acid, stearamide, monoethanolamine stearate and condensation products of ethylene oxide with alcohols, amines and phenols.

References Cited
UNITED STATES PATENTS

| | | | |
|---|---|---|---|
| 2,599,974 | 6/1952 | Carpenter et al. | 260—42 |
| 2,898,309 | 8/1959 | Green | 260—2.1 |
| 3,013,998 | 12/1961 | Battaglieli | 260—23 |
| 3,017,238 | 1/1962 | Levine et al. | 18—54 |
| 3,031,505 | 4/1962 | Pollitzer | 260—584 |
| 3,037,835 | 6/1962 | Bonvicini | 8—55 |
| 3,107,228 | 10/1963 | Cappuccio et al. | 260—2 |
| 3,151,928 | 10/1964 | Cappuccio et al. | 8—115.5 |
| 3,267,046 | 8/1966 | Bonvicini | 260—2 |

DONALD E. CZAJA, Primary Examiner

D. J. BARRACK, Assistant Examiner

U.S. Cl. X.R.

260—2 BP, 2 EP, 23 H, 31.8 M, 32.6 R, 32.6 PQ, 33.2 R, 33.2 EP, 33.4 EP, 33.4 PQ, 897 R, 897 C

PO-1050
(5/69)

UNITED STATES PATENT OFFICE
CERTIFICATE OF CORRECTION

Patent No. 3,661,821          Dated May 9, 1972

Inventor(s) CORNELIO CALDO & GIUSEPPE CANTATORE

It is certified that error appears in the above-identified patent and that said Letters Patent are hereby corrected as shown below:

Column 2, line 36: "poly-amine/the" should read -- polyamine, the --. Column 4, line 56, in the Table, last column, line 16, under the heading "Dissolved product, g./ 100 g. solvent, percent": "0.200" should read -- 0.020 --. Column 5, line 43: "termometer" should read -- thermometer --; line 53: "heating continued" should read -- heating was continued --. Column 6, line 31: "0.2 mol)" should read -- (0.2 mol) --. Column 7, line 29: "tetraethylpentaamine" should read -- tetraethylpentamine --; line 32: "product condensation" should read -- condensation product --; line 65: "0.55%" should read -- 0.055% --. Column 9, line 57: "=0.022%," should read -- =0.022%), --; line 57: "polypropylene [$\lambda$]" should read -- polypropylene ([$\lambda$] --. Column 10, line 53, in the Table, in each of the four (4) columns: "60=" should read -- 60/ --; lines 60-61: "10% solution" should read -- 10% aqueous solution --. Column 11, line 23: "0.26%" should read -- 0.026% --; line 44: "Wood" should read -- Wool --; line 69: "calclated" should read -- calculated --.

Signed and sealed this 21st day of November 1972.

(SEAL)
Attest:

EDWARD M.FLETCHER,JR.
Attesting Officer

ROBERT GOTTSCHALK
Commissioner of Patents